(12) United States Patent
Hsu

(10) Patent No.: US 7,057,360 B1
(45) Date of Patent: Jun. 6, 2006

(54) MOTOR ASSEMBLY FOR FOLDING/UNFOLDING FOLDABLE SCREEN

(76) Inventor: Mu-chuan Hsu, No. 26, Lane 242, Sec. 3, Chung Cherng Rd., Jen Te Hsiang, Tainan County (TW)

( * ) Notice: Subject to any disclaimer, the term of this patent is extended or adjusted under 35 U.S.C. 154(b) by 0 days.

(21) Appl. No.: 11/011,285

(22) Filed: Dec. 13, 2004

(51) Int. Cl.
*H02K 33/00* (2006.01)

(52) U.S. Cl. .......................... 318/105; 318/106; 49/13; 49/14; 49/28

(58) Field of Classification Search ................ 318/105, 318/106; 49/13, 14, 28
See application file for complete search history.

(56) References Cited

U.S. PATENT DOCUMENTS

| | | | | |
|---|---|---|---|---|
| 4,042,028 A | * | 8/1977 | Ennes et al. ................. | 160/263 |
| 4,110,003 A | * | 8/1978 | Zinn ........................... | 359/461 |
| 4,417,185 A | * | 11/1983 | Bullat ........................... | 318/2 |
| 4,427,050 A | * | 1/1984 | Toppen ...................... | 160/315 |
| 4,429,729 A | * | 2/1984 | Winslow ..................... | 160/315 |
| 4,513,805 A | * | 4/1985 | Mase .......................... | 160/299 |
| 4,523,620 A | * | 6/1985 | Mortellite .................... | 160/315 |
| 5,793,174 A | * | 8/1998 | Kovach et al. ............. | 318/468 |
| 5,990,646 A | * | 11/1999 | Kovach et al. ............. | 318/468 |
| 6,057,658 A | * | 5/2000 | Kovach et al. ................ | 318/16 |
| 6,794,778 B1 | * | 9/2004 | Walker et al. ................ | 310/77 |
| 2004/0162040 A1 | * | 8/2004 | Ramus ..................... | 455/127.1 |
| 2004/0217731 A1 | * | 11/2004 | Walker ....................... | 320/101 |

* cited by examiner

*Primary Examiner*—Rita Leykin
(74) *Attorney, Agent, or Firm*—Charles E. Baxley

(57) ABSTRACT

A motor assembly for driving a foldable screen includes an inner tube, a motor device mounted in the inner tube and including a DC motor, an outer tube mounted around the inner tube, a control device, and a connecting device mounted to an end of the inner tube. A screen is mounted to the outer tube. The control device includes a power circuit connected to an external AC power source via a plug. The control device reduces a voltage from the external AC power source and rectifies current from the external AC power source. The control device generates a first DC power source for a circuit system and a second DC power source for driving the motor.

2 Claims, 4 Drawing Sheets

MOTOR ASSEMBLY FOR FOLDING/UNFOLDING FOLDABLE SCREEN

BACKGROUND OF THE INVENTION

1. Field of the Invention

The present invention relates to a motor assembly. In particular, the present invention relates to a motor assembly for folding/unfolding a screen.

2. Description of the Related Art

FIG. 4 of the drawings illustrates a screen 1' and a conventional motor assembly for moving the screen 1' to thereby fold/unfold the screen 1'. The motor assembly comprises an outer tube 1' and a motor control device 2' mounted in the outer tube 1'. The motor control device 2' comprises a DC motor and a controlling circuit board for folding/unfolding the screen 1'. The motor control device 2' is connected to a plug 4' and a controller 5'. The plug 4' includes a transformer and a rectifying circuit mounted therein, thereby reducing the voltage and rectifying current from the AC power source before input into the motor control device 2'. The controller 5' includes an upward button, a downward button, and a stop button for respectively controlling clockwise rotation, counterclockwise rotation, and stop of the motor.

The plug 4' has a relatively large volume, as the plug 4' must accommodate a transformer and a rectifying circuit. Installation of the large-size plug 4' is inconvenient and the resultant assembly is not good-looking.

A recent design of the motor control device 2' comprises a photosensor device (not shown) including a light transmitter, a receiver, a disc with a light-transmission area, and a transmission device for turning the disc as well as controlling rotation and positioning of the motor. However, the overall volume of the motor control device 2' is increased. Thus, the size of the outer tube 1' must be increased for receiving the elements. Further, the outer tube 1' significantly protrudes outward from the wall to which the outer tube 1' is mounted, failing to provide a good appearance.

SUMMARY OF THE INVENTION

An objective of the present invention is to provide a motor assembly for folding/unfolding a screen, wherein the motor assembly may be used with a small-size plug, allowing easy installation and providing a good appearance.

Another objective of the present invention is to provide a motor assembly with a smaller size, providing more flexible utility and allowing more flexible use of space.

A further objective of the present invention is to provide a motor assembly that allows accurate positioning of the screen.

A motor assembly for driving a foldable screen in accordance with the present invention comprises an inner tube, a motor device mounted in the inner tube and including a DC motor, an outer tube mounted around the inner tube, a control device, and a connecting device mounted to an end of the inner tube.

A screen is mounted to the outer tube. The control device includes a power circuit connected to an external AC power source via a plug. The control device reduces a voltage from the external AC power source and rectifies current from the external AC power source. The control device generates a first DC power source for a circuit system and a second DC power source for driving the motor.

In an embodiment of the invention, the outer tube and the motor turn jointly. The control device further comprises a main controller, a motor detecting circuit, a drive circuit, a manual controller, a receiving circuit, a remote controller, and a magnetic ring. The magnetic ring is mounted to an end of the outer tube to turn therewith. The motor detecting circuit is electrically connected to the main controller and includes a sensor for detecting an angular position of the magnetic ring and sending a signal regarding the angular position of the magnetic ring to the main controller. The driving circuit is electrically connected to the driving circuit to the main controller and the motor. The main controller outputs commanding signals to control operation of the motor.

The receiving circuit is electrically connected to the main controller and transmits commanding signals from the remote controller to the main controller. The remote controller includes a plurality of buttons allowing manual input of a user. The magnetic ring is mounted to an end of the inner tube and includes a magnetic member having a plurality of poles corresponding different angular positions of the magnetic ring. The outer tube and the magnetic ring are turned when the motor is activated. The sensor detects turns of rotation of the magnetic ring and the angular position of the magnetic ring.

The motor device comprises a transmission sleeve that is securely connected to the outer tube to turn therewith. The outer tube further comprises an engaging notch in an end thereof. The magnetic ring includes a protrusion for engaging with the engaging notch, allowing joint rotation of the magnetic ring and the outer tube.

The connecting device comprises an inner connecting seat securely mounted in the end of the inner tube. The connecting device further comprises an outer connecting seat securely connected to the inner connecting seat to turn therewith, with an annular groove being defined between the inner connecting seat and the outer connecting seat for receiving the magnetic ring.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
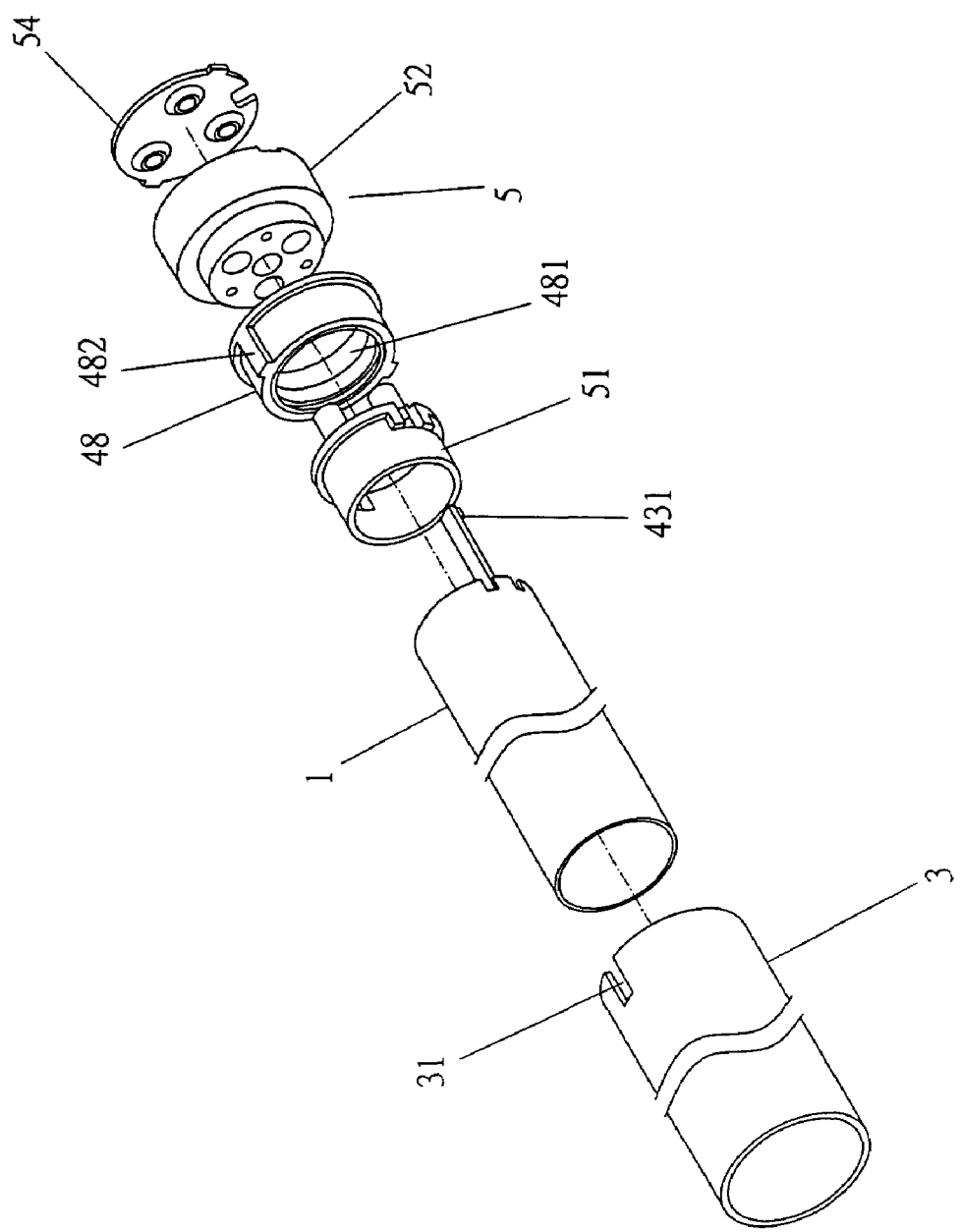
FIG. 1 is an exploded perspective view of a motor assembly in accordance with the present invention.
Figure 2:
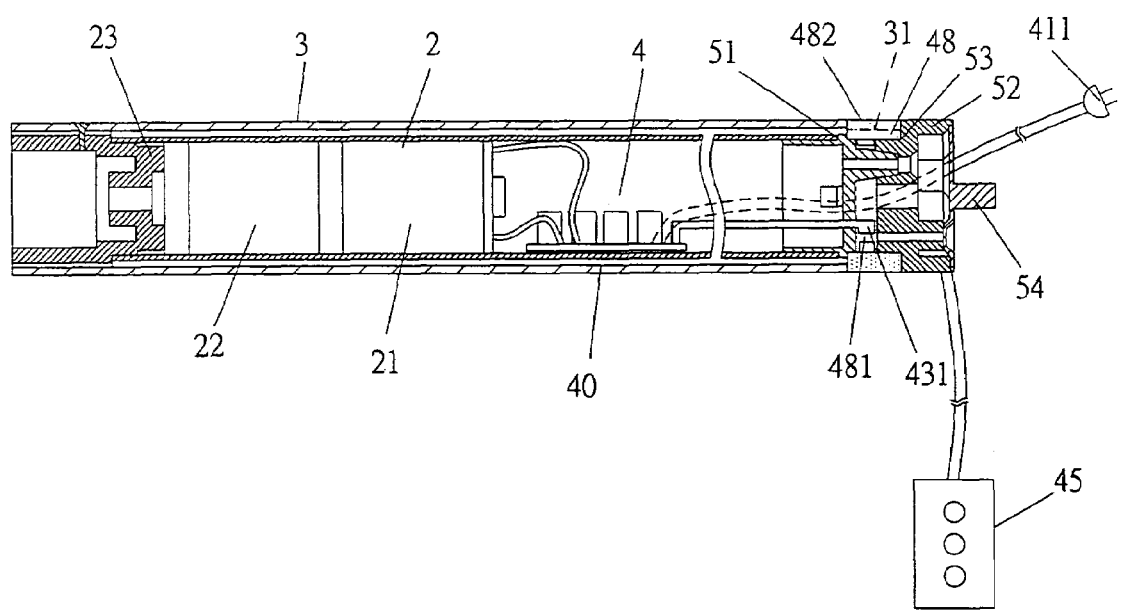
FIG. 2 is a sectional view of the motor assembly in accordance with the present invention.
Figure 3:
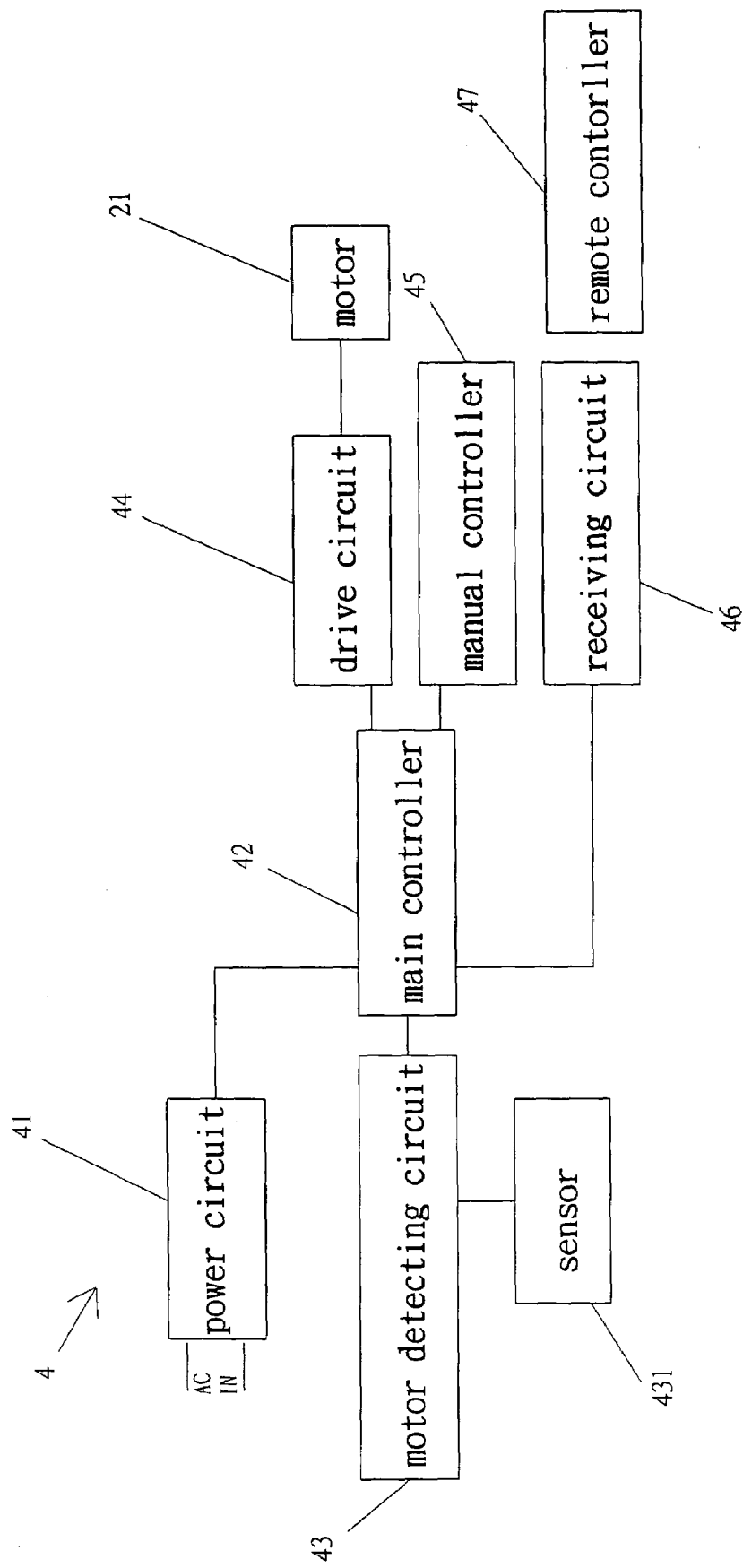
FIG. 3 is block diagram of a control device of the motor assembly in accordance with the present invention.
Figure 4:
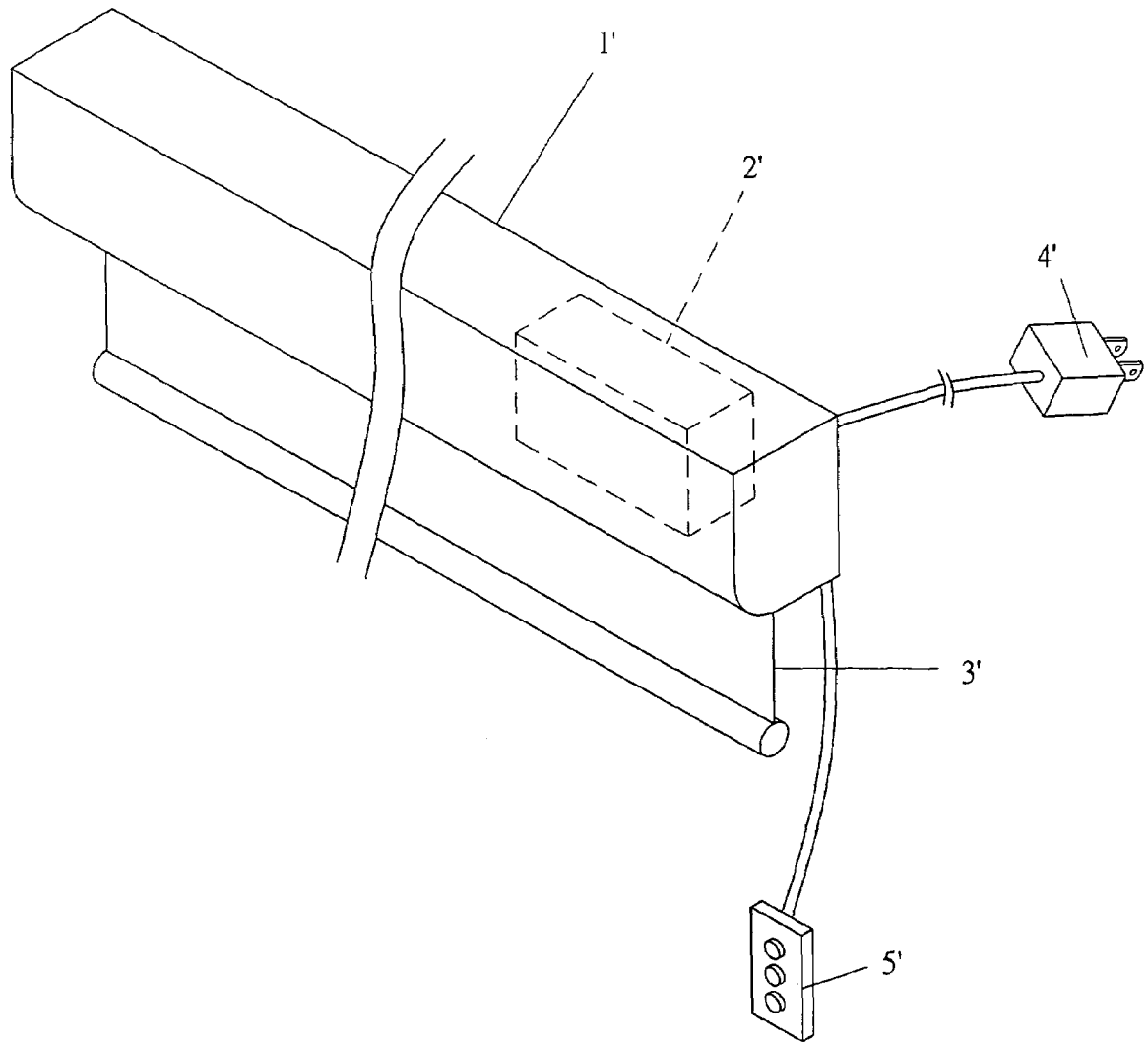
FIG. 4 is a perspective view of a screen and a conventional motor assembly for folding/unfolding the screen.

Referring to FIGS. 1 through 3, a motor assembly for folding/unfolding a screen in accordance with the present invention comprises an inner tube 1, a motor device 2, an outer tube 3, a control device 4, and a connecting device 5. The motor device 2 and a main circuit board 40 of the control device 4 are mounted in the inner tube 1. Further, an end of the inner tube 1 is engaged with the connecting device 5.

The motor device 2 comprises a DC motor 21, a reducer 22, and a transmission sleeve 23 that is securely connected to the outer tube 3 to turn therewith. Thus, the outer tube 3 is turned when the motor 21 is activated.

The outer tube 3 is mounted around the inner tube 1 and includes an end with an engaging notch 31. When the outer tube 3 is turned, a screen (not shown) securely attached to the outer tube 3 is also moved upward or downward, thereby folding or unfolding the screen, which is conventional.

The control device 4 is coupled with the motor 2 and comprises a power circuit 41, a main controller 42, a motor detecting circuit 43, a drive circuit 44, a manual controller 45, a receiving circuit 46, a remote controller 47, and a magnetic ring 48. The power circuit 41 is electrically connected to an AC power source via a plug 411 and comprises a PWM (pulse-width modulation) high-frequency switching circuit for reducing the voltage and for rectifying current. Further, the power circuit 41 generates a 5V DC current for the circuit system and a 12V DC power source for the motor 21.

The motor detecting circuit 43 is electrically connected to the main controller 42 that includes a microprocessor. The motor detecting circuit 43 includes a sensor 431 that cooperates with the magnetic ring 48. The sensor 431 detects an angular position of the magnetic ring 48 and sends a corresponding signal to the main controller 42.

The drive circuit 44 is electrically connected to the main controller 42 and the motor 21. The drive circuit 44 operates in response signals from the main controller 42 to control clockwise rotation, counterclockwise rotation, and stop of the motor 21. The manual controller 45 is electrically connected to the main controller 42 and includes an upward button, a downward button, a stop key, and/or setting buttons for controlling operation of the motor 21.

The receiving circuit 46 is electrically connected to the main controller 42 and transmits commanding signals from the remote controller 47 to the main controller 42. The remote controller 47 includes an upward button, a downward button, a stop button, setting buttons, and/or other buttons (not shown) for controlling operation of the control device 4. Two or more control devices 4 can be connected in series and controlled by a single remote controller 47 to control operations of at least two motors.

The magnetic ring 48 is mounted on the connecting device 5, which, in turn, is mounted to an end of the inner tube 1. The magnetic ring 48 includes a magnetic member 481 comprising a plurality of poles (e.g., twenty four poles) corresponding to different angular positions (e.g., twenty four positions) of the magnetic ring 48. Thus, magnetism is obtained when the magnetic ring 48 turns through fifteen (15) degrees. Further, the magnetic ring 48 includes a protrusion 482 on an outer periphery thereof for engaging with the engaging notch 31 of the outer tube 3, allowing joint rotation of the outer tube 3 and the magnetic ring 48.

The connecting device 5 comprises an inner connecting seat 51 and an outer connecting seat 52. The inner connecting seat 51 is securely mounted to the end of the inner tube 1. Further, the outer connecting seat 52 is securely engaged with the inner connecting seat 51, with an annular groove 53 being defined between the inner connecting seat 51 and the outer connecting seat 52. Further, a connecting plate 54 is fixed to the outer connecting seat 53.

External AC power is input to the power source circuit 41 via the plug 411, with the voltage from the AC power source being reduced and with current from the AC power source being rectified by the power source circuit 41. Thus, the motor assembly in accordance with the present invention may be used with a small-size plug, allowing easy installation and providing a good appearance.

When the motor 21 is activated, the transmission sleeve 23, the outer tube 3, and the magnetic ring 48 are turned. When the motor 21 turns to a pre-set position that is set by pressing the buttons on the manual controller 45 or the remote controller 47, the motor 21 is stopped, as the sensor 431 of the motor detecting circuit 43 detects the turns of rotation of the magnetic ring 48 and the angular position of the magnetic ring 48. An accurate positioning effect is obtained. Further, in a case that the motor 21 has turned through a pre-determined maximum rotation, the motor 21 is deactivated to prevent damage to the motor 21.

The magnetic ring 48 is mounted in the annular groove 53 defined by the connecting device 5 mounted to the end of the inner tube 1. Thus, the volume of the inner tube 1 is not increased although a magnetic ring 48 is provided. The overall size of the motor assembly is not increased, providing more flexible utility and allowing more flexible use of space, as the motor assembly would not significantly protrude beyond the wall to which the motor assembly is mounted.

Although specific embodiments have been illustrated and described, numerous modifications and variations are still possible without departing from the essence of the invention. The scope of the invention is limited by the accompanying claims.

What is claimed is:

1. A motor assembly for driving a foldable screen, comprising:
   an inner tube;
   a motor device mounted in the inner tube, the motor device including a DC motor; an outer tube mounted around the inner tube, a screen being adapted to be mounted to the outer tube;
   a control device including a power circuit connected to an external AC power source via a plug, the control device reducing a voltage from the external AC power source and rectifying current from the external AC power source, the control device generating a first DC power source for a circuit system and a second DC power source for driving the motor;
   a connecting device mounted to an end of the inner tube wherein the outer tube and the motor turn jointly, the control device further comprising a main controller, a motor detecting circuit, a drive circuit, a manual controller, a receiving circuit, a remote controller, and a magnetic ring, the magnetic ring being mounted to an end of the outer tube to turn therewith, the motor detecting circuit being electrically connected to the main controller and including a sensor for detecting an angular position of the magnetic ring and sending a signal regarding the angular position of the magnetic ring to the main controller, the drive circuit being electrically connected to the main controller and the motor, the main controller outputting commanding signals to control operation of the motor, the receiving circuit being electrically connected to the main controller, the remote controller including a plurality of buttons allowing manual input of a user, the magnetic ring including a magnetic member having a plurality of poles corresponding different angular positions of the magnetic ring, the outer tube and the magnetic ring being turned when the motor is activated, with the sensor detecting turns of rotation of the magnetic ring and the angular position of the magnetic ring wherein the motor device comprises a transmission sleeve that is securely connected to the outer tube to turn therewith, the outer tube further comprising an engaging notch in an end thereof, the magnetic ring including a protrusion for engaging with the engaging notch, allowing joint rotation of the magnetic ring and the outer tube.

2. The motor assembly for driving a foldable screen as claimed in 1 wherein the connecting device comprises an inner connecting seat securely mounted in the end of the inner tube, the connecting device further comprising an outer connecting seat securely connected to the inner connecting seat to turn therewith, with an annular groove being defined between the inner connecting seat and the outer connecting seat for receiving the magnetic ring.

* * * * *